INVENTOR
HORST FRINGS

BY *Dicker & Craig*
ATTORNEYS

INVENTOR
HORST FRINGS

BY Dicke + Craig
ATTORNEYS

United States Patent Office 3,486,488
Patented Dec. 30, 1969

3,486,488
PISTON INTERNAL COMBUSTION ENGINE WITH
A COOLING WATER CIRCULATORY SYSTEM
PRODUCED BY A WATER PUMP
Horst Frings, Schmiden uber Fellbach, Wurttemberg,
Germany, assignor to Daimler-Benz Aktiengesellschaft,
Stuttgart-Unterturkheim, Germany
Filed July 25, 1966, Ser. No. 567,639
Claims priority, application Germany, July 31, 1965,
D 47,873
Int. Cl. F01p 9/00, 11/14, 11/08
U.S. Cl. 123—41.01                              21 Claims

ABSTRACT OF THE DISCLOSURE

A piston internal combustion engine with a cooling water circulatory system produced by a water pump in which are provided, on the one hand, heat-exchanging devices for the lubricating oil, the cooling water, exhaust gases, or the like, and on the other, means for preventing the erosions at the cooling wall spaces of the cylinder block which are caused by the cavitation whereby additional pressure-reducing devices and/or one or several heat-exchange devices producing external hydraulic resistances of the water pump are arranged between the pressure side of the water pump and the endangered cooling wall spaces for the adaptation of the water pressure prevailing between the endangered cooling wall spaces to the saturation pressure corresponding to the respectively static cooling water temperature.

---

The present invention relates to a piston internal combustion engine with a cooling-water circulation produced by a water pump in which are provided, on the one hand, heat-exchanger installations for the lubricant, the cooling water, the exhaust gases, etc., and, on the other, means for preventing the erosion at the cooling space walls of the cylinder block influenced by the cavitation.

Strong erosions occur in liquid-cooled piston internal combustion engines at the cooling space walls which are wetted by the cooling medium and which oscillate or vibrate under the influence of the piston lateral pressures, especially at the cylinder liner or sleeve. These material destructions can be traced back to the implosion of vapor bubbles, also called cavitation. Pressures up to 1,000 atmospheres absolute excess pressure and temperatures up to 2,700° C. as well as high electrical charges and dissociation appearances occur thereby within the core of the imploding or collapsing vapor bubbles.

For purposes of preventing the material destructions conditioned by the cavitation at the cooling space walls of the piston internal combustion engines, it is already known in the prior art to arrange bodies within the cooling water space surrounding the cylinder liner which are provided with a plurality of hollow spaces open in the direction toward the cylinder liner whose upper boundary wall is upwardly inclined at an acute angle to the horizontal and which are connected with the frame by the interposition of an elastic layer. By the use of this known measure, air cushions enclosed in or surrounded by the hollow bodies are to be formed during the filling-in of the cooling water owing to the inclined arrangement of the upper boundary walls, which air cushions elastically absorb the shocks and impacts from the piston lateral pressure acting on the cylinder liner and transmitted by way of the cooling water layer disposed therebetween and which prevent the propagation thereof to the frame wall.

The present invention is also the result of tests with the aim to prevent the material destructions produced by the caviation at the cooling space walls of liquid-cooled piston internal combustion engines. However, in contrast to the aforementioned measures followed in the prior art, different approaches are taken for the solution thereof in accordance with the present invention.

The aforementioned cavitation together with its harmful consequences occurs predominantly in large types of engines, i.e., high horsepower engines, but to a lesser extent or not at all with smaller engines, for example, with motor vehicle engines. Apart from the constructional differences of the comparative engine sizes, the cooling water pressure, which at essentially the same cooling water temperature is several times larger with the large types of engines as compared to the smaller types of engines, is a decisive cause for the occurrence of the strong material destructions and corrosions in the larger types of engines. The higher the cooling water pressure above the saturation pressure corresponding to the static cooling water temperature, the larger is the implosion velocity of the vapor bubbles. The implosion velocity may be taken as a measure for the intensity of the material destructions. The nearer the cooling water is to the corresponding saturation pressure, the smaller and therewith the less harmful for the cooling space walls is the resulting implosion velocity.

With piston internal combustion engines constructed in the manner described hereinabove, the cooling water temperature which occurs at the endangered cooling space walls lies, for example, at or above 80° C. A saturation pressure of about 0.5 atmospheres (absolute excess pressure) corresponds to this temperature. However, the cooling water pressure between the endangered cooling space walls may rise up to, for example, three atmospheres. However, as a result of this pressure difference, the critical implosion velocity of the vapor bubbles, critical in relation to the occurrence of the material destructions is exceeded by far.

According to the present invention, the material destructions and erosions caused by the cavitation are avoided at the endangered cooling space walls of a piston internal combustion engine of the aforementioned type in that additional pressure-reducing devices and/or one or several heat-exchange installations producing external hydraulic resistances of the water pump are arranged in the cooling water circulatory system for purposes of matching the water pressure prevailing between the endangered cooling space walls to the saturation pressure corresponding to the respective static cooling water temperature. The pressure drop in the heat-exchange installations is utilized by this measure in order to achieve the adaptation of the water pressure between the endangered cooling space walls to the saturation pressure corresponding to the static water temperature. The fact is thereby taken into consideration that the temperature increase in the cooling water circulatory system of the piston internal combustion engine endangered by cavitation due to heat absorption is only very small compared to the average cooling medium temperature so that by changes in the conduction of the water circulatory system according to the present invention no disadvantageous consequences for the cooling of the internal combustion engines can arise.

The pressure-reducing devices in the cooling water circulatory system may be controllable in an advantageous manner in dependence on the cooling medium temperature. The water pressure may be adjusted thereby to a point at or near the saturation pressure of the corresponding prevailing water temperature.

Furthermore, the cylinder head as the largest external hydraulic resistance of the water pump may be arranged in the cooling water circulatory system between the pressure side of the water pump and the endangered cooling space walls so that a particularly low water pressure is established in the cylinder block.

According to a further feature of the present invention, the water pressure between the endangered cooling space walls can be kept low in that one or several heat-exchange installations and/or the cylinder head are arranged in the cooling water circulatory system parallel to the endangered cooling space walls. The same effect can be further achieved according to the present invention if several heat-exchange installations and/or the cylinder head and one or several heat-exchange installations are arranged in the cooling wateer circulatory system in parallel and upstream of the endangered cooling space walls.

With a known water distribution system for motor vehicle engines having a water-cooled cylinder head, the water flows at first through the cylinder head and then through the cooling jacket of the cylinder. This cooling water distribution, however, is to serve only the purpose to achieve a uniform heat-distribution between the cylinder block and the cylinder head. No suggestion or indication about measures for preventing the cavitation according to the proposal of the present invention can be found in the known installation.

A prior art cooling system for internal combustion engines is so constructed that the cooling jackets of the cylinders are located on the suction side and the water spaces of the cylinder heads on the pressure side of a cooling water pump located at the transition place of the cooling jackets of the cylinders into the cooling jackets of the cylinder head. By this arrangement is intended to be achieved that the cooling water is pressed or forced by means of the pump directly above the cylinder heads and the exhaust valves, i.e., the hottest parts of the engine; that is, these same parts are exposed directly to the pressure effect of the pump whereby a vapor formation in the water spaces is prevented. A completely different problem from that of the present application is to be solved also by this last-described prior art cooling system.

With another known circulatory cooling system for internal combustion engines with horizontal cylinders, especially for water-cooled vehicle internal combustion engines, the cooling medium flows at first through the cylinder head, then flows uniformly about the cylinder, preferably over its entire length, in order to leave thereafter the cylinder block. Large operating plays of the piston and a large oil consumption are to be avoided thereby which are caused by thermally non-uniform loads of the cylinder and therewith of the cylinder liner. Consequently, this prior art circulatory system could give no suggestion for the present invention.

Furthermore, an installation in a circulatory system of the cooling water produced by a thermal syphoning effect in internal combustion engines forms part of the state of the art in which the water distribution pipes, which are arranged on the inside of the cylinder head in the longitudinal direction thereof, are installed for conducting and guiding the cooling water circulation in the cylinder block of the engine. Measure and means for preventing the material destruction at the cooling space walls caused by cavitation are also completely absent in this known installation.

Accordingly, it is an object of the present invention to provide a cooling water circulatory system for piston internal combustion engines which avoids, by simple means, the shortcomings and drawbacks encountered in the prior art constructions.

Another object of the present invention resides in a piston internal combustion engine having a cooling water circulation produced by a water pump in which the material destruction and erosion in the cooling space walls of the cylinder block, caused by cavitation, are effectively and significantly minimized, if not eliminated, to increase the length of life of the engine.

A further object of the present invention resides in large-horsepower piston internal combustion engines of the type described above which are equipped with means preventing damage to certain parts of the cooling system as a result of the cavitation effect.

These and further objects, features and advantages of the present invention will become more obvious from the following description when taken in connection with the accompanying drawing which shows, for purposes of illustration only, several embodiments in accordance with the present invention, and wherein.

Figure 1:
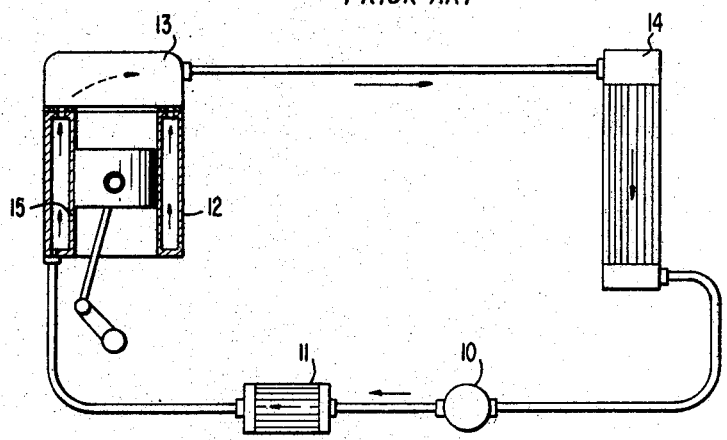
FIGURE 1 is a schematic view of a prior art cooling water circulatory system in a piston internal combustion engine.

Referring now to the drawing wherein like reference numerals are used throughout the various views to designate like parts, and more particularly to the prior art arrangement of FIGURE 1, the cooling water is supplied to the cylinder block 12 in the customary manner by means of the cooling water pump 10 by way of the oil cooler 11. From the cylinder block 12 the cooling water flows into the cylinder head 13 and is subsequently supplied to the water cooler or condenser 14. The water cooler 14 is connected to the suction side of the water pump 10.

A relatively high water pressure occurs at the cooling space walls endangered by the cavitation within the area of the cylinder liner indicated at 15 and vibrating under the influence of the piston lateral pressures since the cylinder head 13 and the water cooler 14, each having relatively large hydraulic resistances, are connected in series in the cooling water circulatory system downstream of the cylinder block 12.

Figure 2:
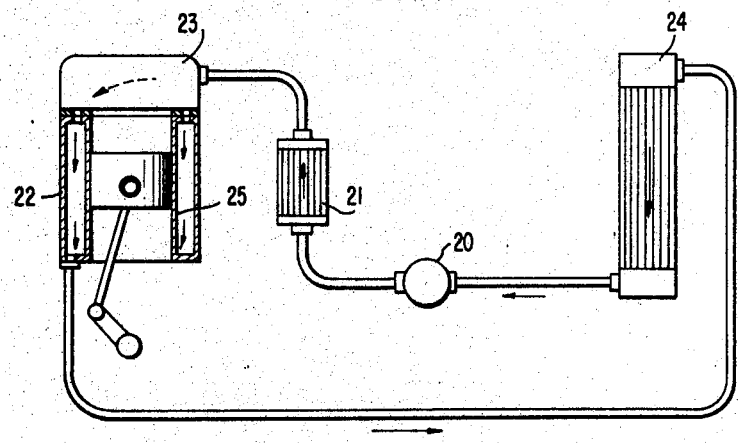
FIGURE 2 is a schematic view of a first embodiment of a cooling water circulatory system according to the present invention in a piston internal combustion engine.

In the cooling water circulatory system according to the present invention illustrated in FIGURE 2, the water pump 20 again supplies the cooling medium by way of an oil cooler 21 at first to the cylinder head 23. From the cylinder head 23 the cooling water flows with a relatively low pressure into the cylinder block 22 toward the cylinder liners 25. The cooling water is conducted from the cylinder block 22 back again to the water pump 20 by way of the water cooler or condenser 24 of any known construction. In this cooling water circulatory system, the pressure drop in the oil cooler 21 as well as in the cylinder head 23 is utilized in order to reduce the water pressure within the area of the cylinder liners 25 to the respective saturation pressure.

Figure 3:
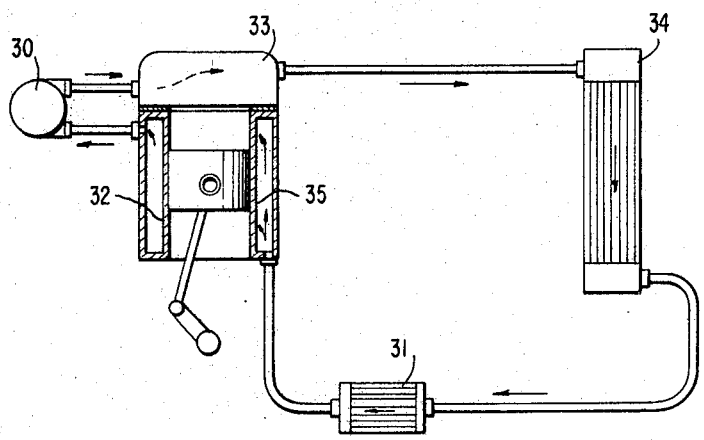
FIGURES 3 and 4 are schematic views of two further modified embodiments of cooling water circulatory systems according to the present invention in piston internal combustion engines.

With the cooling water circulatory system according to FIGURE 3, the cylinder head 33, the water cooler 34 and the oil cooler 31 are connected in series between the pressure side of the water pump 30 and the endangered cooling space walls within the area of the cylinder liners 35 so that the water pressure in the cylinder block 32 is effectively reduced.

Figure 4:
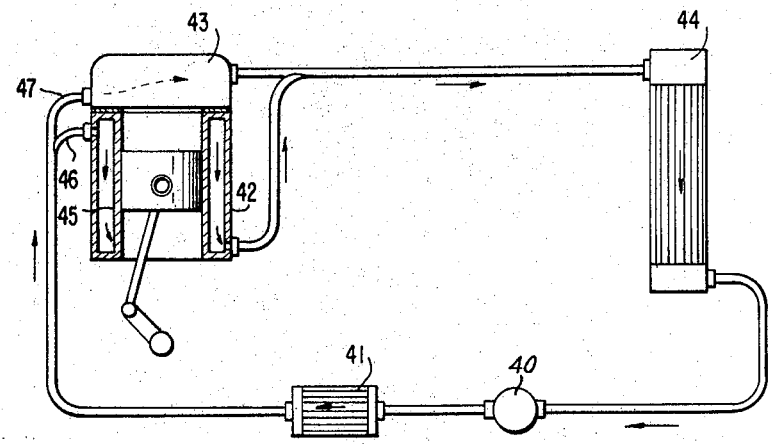

By the use of the parallel arrangement of cylinder block 42 and cylinder head 43 in the cooling water circulatory system according to FIGURE 4, favorable pressure conditions can also be created within the area of the cylinder liners 45. The water pump 40 supplies the cooling medium again to the oil cooler 41, from which parallel lines 46 and 47 conduct the cooling medium, respectively to the cylinder block 42 and to the cylinder head 43. By appropriate dimensioning of the lines 46 and 47, in which temperature-influenced control means of conventional construction may also possibly be arranged, it is possible to adapt the cooling advantageously to the different local requirements and the water pressure within the area of the cylinder liners 45 to the respective associated saturation pressure. The lines 46 and 47 are again combined upstream of the water cooler 44 and the latter is connected to the suction side of the water pump 40.

By the parallel arrangement of one or several members forming external hydraulic resistances for the water pump such as oil cooler, cylinder head, and/or water cooler for the cooling water, with respect to the endangered cooling space walls within the area of the cylinder liners, the hydraulic overall resistance of the cooling water circulatory system can be decreased so that the water pressure within the area of the endangered cooling space walls and therewith the danger of harmful material destructions caused by cavitation can be effectively reduced.

While I have shown and described several embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications.

I claim:

1. A piston internal combustion engine having cylinder block means provided with cooling space wall means, and a cooling water circulatory system for said engine including water pump means, heat-exchange means, and further means in said circulatory system between the pressure side of said pump means and said cooling space wall means for preventing the erosion caused by cavitation at the cooling space wall means of the cylinder block means, said last-mentioned means effectively producing a pressure drop in order to match the water pressure prevailing between the endangered cooling space wall means approximately to the saturation pressure corresponding to the respective static cooling water temperature between the pressure side of the water pump means and said endangered cooling space walls.

2. A piston internal combustion engine according to claim 1, wherein said further means includes additional pressure-reducing means.

3. A piston internal combustion engine according to claim 2, wherein said additional pressure-reducing means include several pressure-reducing devices.

4. A piston internal combustion engine according to claim 3, wherein said further means includes hydraulic resistance means external of the water pump means.

5. A piston internal combustion engine according to claim 4, wherein said further means includes at least one of said heat-exchange means producing an hydraulic resistance external of said water pump means.

6. A piston internal combustion engine according to claim 4, wherein said further means includes several heat-exchange means producing an hydraulic resistance external of said water pump means.

7. A piston internal combustion engine according to claim 1, wherein said further means includes additional pressure-reducing devices and at least one hydraulic resistance means external of said water pump means.

8. A piston internal combustion engine according to claim 1, wherein said further means includes hydraulic resistance means external of the water pump means.

9. A piston internal combustion engine according to claim 1, wherein said further means includes at least one of said heat-exchange means producing an hydraulic resistance external of said water pump means.

10. A piston internal combustion engine according to claim 1, wherein said further means includes several heat-exchange means producing an hydraulic resistance external of said water pump means.

11. A piston internal combustion engine according to claim 8, further including cylinder head means arranged as external hydraulic resistance means in the cooling water circulatory system between the pressure side of the water pump means and the endangered cooling space wall means.

12. A piston internal combustion engine according to claim 11, wherein several of said external hydraulic resistance means are arranged upstream with respect to said endangered cooling space wall means.

13. A piston internal combustion engine according to claim 12, wherein said external hydraulic resistance means are constituted by heat-exchange devices.

14. A piston internal combustion engine according to claim 13, wherein said external hydraulic means include the cylinder head means.

15. A piston internal combustion engine according to claim 11, wherein said external hydraulic resistance means are constituted by heat-exchange devices.

16. A piston internal combustion engine according to claim 15, wherein said external hydraulic means include the cylinder head means.

17. A piston internal combustion engine according to claim 8, wherein several of said external hydraulic resistance means are arranged upstream with respect to said endangered cooling space wall means.

18. A piston internal combustion engine according to claim 11, wherein said external resistance means include at least one heat-exchange device and the cylinder head means.

19. A piston internal combustion engine according to claim 11, wherein said external resistance means is constituted by said cylinder head means.

20. A piston internal combustion engine according to claim 11, wherein said external resistance means include several heat-exchange devices.

21. A piston internal combustion engine having cylinder head means according to claim 8, wherein several external resistance means including at least one heat-exchange means, are arranged in the cooling water circulatory system upstream of the endangered cooling space wall means and the cylinder head means are arranged in a flow path alternate to that including said endangered cooling space wall means.

References Cited

UNITED STATES PATENTS

| | | | |
|---|---|---|---|
| 1,443,006 | 1/1923 | Church | 123—41.33 X |
| 1,476,327 | 12/1923 | Duesenberg. | |
| 1,877,051 | 9/1932 | Read | 123—41.82 |
| 2,059,916 | 11/1936 | Smith | 123—41.29 X |
| 2,345,233 | 3/1944 | Bradley | 123—41.29 |
| 2,369,105 | 2/1945 | Ginn et al. | 123—41.33 |
| 2,377,028 | 5/1945 | Nicholas | 123—41.29 X |
| 2,038,193 | 4/1936 | Parsons. | |
| 2,133,514 | 10/1938 | Holmes. | |
| 2,262,659 | 11/1941 | Ware. | |
| 3,139,073 | 6/1964 | White et al. | 123—41.29 |

AL LAWRENCE SMITH, Primary Examiner

U.S. Cl. X.R.

123—41.15, 41.29, 41.33, 41.51, 41.82